United States Patent
Gupta et al.

(10) Patent No.: US 11,005,958 B2
(45) Date of Patent: **\*May 11, 2021**

(54) SHARING PERSONALIZED ENTITIES AMONG PERSONAL DIGITAL ASSISTANT USERS

(71) Applicant: Microsoft Technology Licensing, LLC, Redmond, WA (US)

(72) Inventors: Rahul Gupta, Hyderabad (IN); Amar Kumar Dubedy, Bellevue, WA (US); Gurpreet Singh, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,754

(22) Filed: Jan. 16, 2020

(65) Prior Publication Data

US 2020/0259913 A1  Aug. 13, 2020

Related U.S. Application Data

(63) Continuation of application No. 15/063,484, filed on Mar. 7, 2016, now Pat. No. 10,554,772.

(51) Int. Cl.
| | |
|---|---|
| *G06F 15/16* | (2006.01) |
| *H04L 29/08* | (2006.01) |
| *G06Q 30/02* | (2012.01) |
| *G06Q 50/00* | (2012.01) |
| *H04L 12/58* | (2006.01) |

(52) U.S. Cl.
CPC ......... *H04L 67/26* (2013.01); *G06Q 30/0201* (2013.01); *G06Q 50/01* (2013.01); *H04L 51/12* (2013.01); *H04L 51/32* (2013.01)

(58) Field of Classification Search
CPC ....................................................... H04L 67/26
USPC .................................................. 709/203, 206
See application file for complete search history.

(56) References Cited

U.S. PATENT DOCUMENTS

| | | | |
|---|---|---|---|
| 9,396,195 B1* | 7/2016 | Beguelin | H04N 21/4826 |
| 2005/0027742 A1* | 2/2005 | Eichstaedt | H04N 21/41407 |
| 2011/0314064 A1* | 12/2011 | Jeyaseelan | H04L 51/066 |
| | | | 707/803 |
| 2012/0233120 A1* | 9/2012 | Nijim | H04N 21/4627 |
| | | | 707/626 |
| 2013/0103814 A1* | 4/2013 | Carrasco | H04L 65/4092 |
| | | | 709/223 |

(Continued)

*Primary Examiner* — Duyen M Doan

(57) ABSTRACT

Architecture that enables a user to designate acceptance to receiving social cards from other user in a social network using a personal digital assistant. A mapping component maintains the mappings of all users who have accepted to participate in card sharing and the acceptance level. A whitelist of users can be created that lists the users to whom a social card can be sent from an endpoint. The user can create local groups dynamically at runtime on the local endpoint, where the local groups enable the sharing of the personalized content with multiple users concurrently. The shared card is selected by the sending user and becomes available to the PDA on the proactive canvas of the recipient's PDA along with other cards. Based on the user engagement history, these cards can be ranked among other cards social or non-social PDA cards. Conflation, push notifications, and filtering are also provided.

20 Claims, 7 Drawing Sheets

(56) References Cited

U.S. PATENT DOCUMENTS

2015/0067106 A1\* 3/2015 Jaynes ................ H04L 65/4038
709/219
2017/0041436 A1\* 2/2017 Lopez, Jr. ........... G06F 16/9566

\* cited by examiner

SHARING PERSONALIZED ENTITIES AMONG PERSONAL DIGITAL ASSISTANT USERS

CROSS-REFERENCE TO RELATED APPLICATIONS

This application is a Continuation of U.S. application Ser. No. 15/063,484 (now U.S. Pat. No. 10,554,772), filed Mar. 7, 2016, entitled "SHARING PERSONALIZED ENTITIES AMONG PERSONAL DIGITAL ASSISTANT USERS," the entire disclosure of which is hereby incorporated herein by reference. To the extent appropriate, a claim of priority is made to the above disclosed application.

BACKGROUND

The social interaction capability of social networks is a principal motivation for users in joining such social networks. The social interaction can include the sharing of content is an important aspect of the user socialization. However, existing solutions do not provide a single solution that enables the user to share personalized information among users of all content types and from all possible sources.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables a new channel of social networking of personalized entities (content) created and used by a personal digital assistant (PDA) of an endpoint. The architecture is a one-stop solution that enables the sharing (sending and receiving) among users of all types of content from all possible sources. The entity shared is personalized, and thus, the entity that the user shares (sends) with other shared users (receives) is an entity meant for (personalized to) the sharing user.

The architecture enables a user of a PDA to subscribe to receiving the personalized entity(ies) as social cards from a contact list of other users and then to share the social card with another user (or users) who chooses to enable acceptance of a social card from the sharing user.

The architecture can be implemented as a system that includes a remote (a separate component or service on a network accessible to multiple different endpoints) subscription component configured to enable the subscription (registration) of endpoints to participate in the sharing of instances of personalized relevant entities (P-Es) (also referred to as social cards). The endpoints can be any type of device, such as desktop computing devices, mobile devices (e.g., cell phones), tablet PCs, laptops, and so on. The sharing of the personalized relevant entities can be performed via PDAs (e.g., intelligent interactive PDAs such as Cortana™ by Microsoft Corporation) of the corresponding endpoints.

That is, in an example where a second endpoint subscribes to receive personalized relevant entities from a first endpoint, the second endpoint comprises a second PDA via which to engage the disclosed architecture of social card acceptance via the remote subscription component. In this example, the second (or receiving or accepting) user of the second endpoint subscribes to receive/accept a personalized relevant entity ($P-E_1$) from the first user of the first endpoint or multiple other users of other corresponding endpoints.

It is within contemplation of the disclosed architecture that subscription can include various levels that enable the subscribing user to choose different levels of subscription. For example, levels of subscription can include to only send, only receive, or send and receive. Moreover, subscription can be defined according to sending to/accepting from specific users and groups of users, for example. Thus, while subscription is described herein as choosing to accept social cards, it is to be understood that subscription can be configured to include one or more of these additional subscription levels.

Endpoint subscription can be performed to indicate the endpoint is contracted to receive the entity(ies) from any user or from a specific user or users only, for example. Once subscription by the subscribing endpoint is completed, other users who are defined in the (acceptance) contacts to share entities with the subscribed endpoint can send personalized entities to that subscribed endpoint.

It is to be appreciated that accepting the sharing of entities from other users (endpoints) or sharing the entities with other users has the effect of socially boosting inferences information (e.g., likes, dislikes, preferences, etc.) about the user. When a sharing user has sent an entity to the receiving user, based on how the receiving user has engaged with the entity, the PDA can learn new personal preferences about the receiving user and can be configured to automatically send similar entities to the receiving user in future.

A mapping component (a component or service on a network) can be provided in communication with the remote subscription component and configured to enable the creation and maintenance of mappings as part of the subscription process, which mappings define (map) acceptances between the endpoints that subscribe to entity sharing and securely store the (acceptance) mappings. The mapping component can also store acceptance levels such as to receive from all other users, received only from a contact list, receive only from family (e.g., an inner circle), etc. The mapping component can be configured to enable access by the subscription component to check on a (social) status of an endpoint (or endpoint user) via the mappings. The status requested or identified can be whether the endpoint (user) is online, available, subscribed to acceptance, temporarily not accepting entities, and so on.

Each endpoint can comprise a local subscription interface that communicates with the remote subscription component to handle notifications, endpoint status information, endpoint subscriptions, mappings, and so on. The local subscription interface can be a module that is part of the client device PDA or is separate from the PDA but operates to perform at least the above-mentioned functions for the PDA and disclosed architecture.

The remote subscription component can be configured to enable communication of a notification to a second endpoint (via the local subscription interface of the second endpoint) that sharing is accepted by the first endpoint and a personalized relevant entity (the $P-E_1$) is waiting to be received or has already been received by the first endpoint.

The remote subscription component can be configured to enable conflation of duplicative instances of the personalized relevant entities. Thus, the same or similar (by some measurable parameters) P-Es sent from the first endpoint and other sending endpoints are eliminated so that only a single P-E, the $P-E_1$, is received by the second endpoint.

The subscription component can be configured to enable filtering of the personalized relevant entities based on current user interests, and also configured to synchronize user-created local groups among endpoints based on a one-to-many endpoint mapping relationship.

The mapping component can be configured to generate a whitelist for a sharing endpoint, the first endpoint. The whitelist identifies endpoints suitable for receiving of the personalized relevant entities from the sharing endpoint (the first endpoint). The whitelist can be generated by the mapping component for the first endpoint, or the first user of the first endpoint can generate the whitelist at the first endpoint. In this first scenario, the first user can request a listing of all mapped users (receiving users) of the first user. This list can then be downloaded to the first endpoint for any desired editing by the first user to remove one or more users. In this latter scenario, the whitelist then never exists at the mapping component, but is created and resides on the first endpoint.

The subscription component can be configured to enable ranked groups of valid endpoints from which to receive the personalized relevant entities, as defined in the mapping component. The ranked groups can have different designations of sharing. For example, when identifying users who are allowed to share their P-Es, these users can be differentiated by groups such as an "inner circle" of users, and an "outer circle" of users. Thus, as commonly understood, the inner circle of sharing users can be those users who are considered to be more influential to the accepting user than the outer circle of users, who are less influential to the accepting user. The personalized relevant entities can be represented visually as cards viewable in a card canvas of the personal digital assistant, and the cards can be ranked according to card-engagement history of the user. The engagement history can be analyzed to understand the how often, for example, the receiving user will interact with (e.g., view, view within a specific time period, respond to, etc.) a P-E from a given user or group of users.

The disclosed architecture can be implemented as a method, that discovers entities relevant to a first user; generates a personalized relevant entity of the first user from the discovered relevant entities; and shares the personalized relevant entity with a second user of a social network via a personal digital assistant of the first user and personal digital assistant of the second user.

The disclosed architecture can be implemented as an alternative method, that discovers entities relevant to a first user; generates a personalized entity of the first user from the discovered relevant entities; creates an acceptance mapping between the first user and a second user; sends a notification of the shared personalized entity to a personal digital assistant of the second user; and, shares the personalized entity with the second user of a social network via the personal digital assistant based on an acceptance by the second user to receive the personalized relevant entity of the first user.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
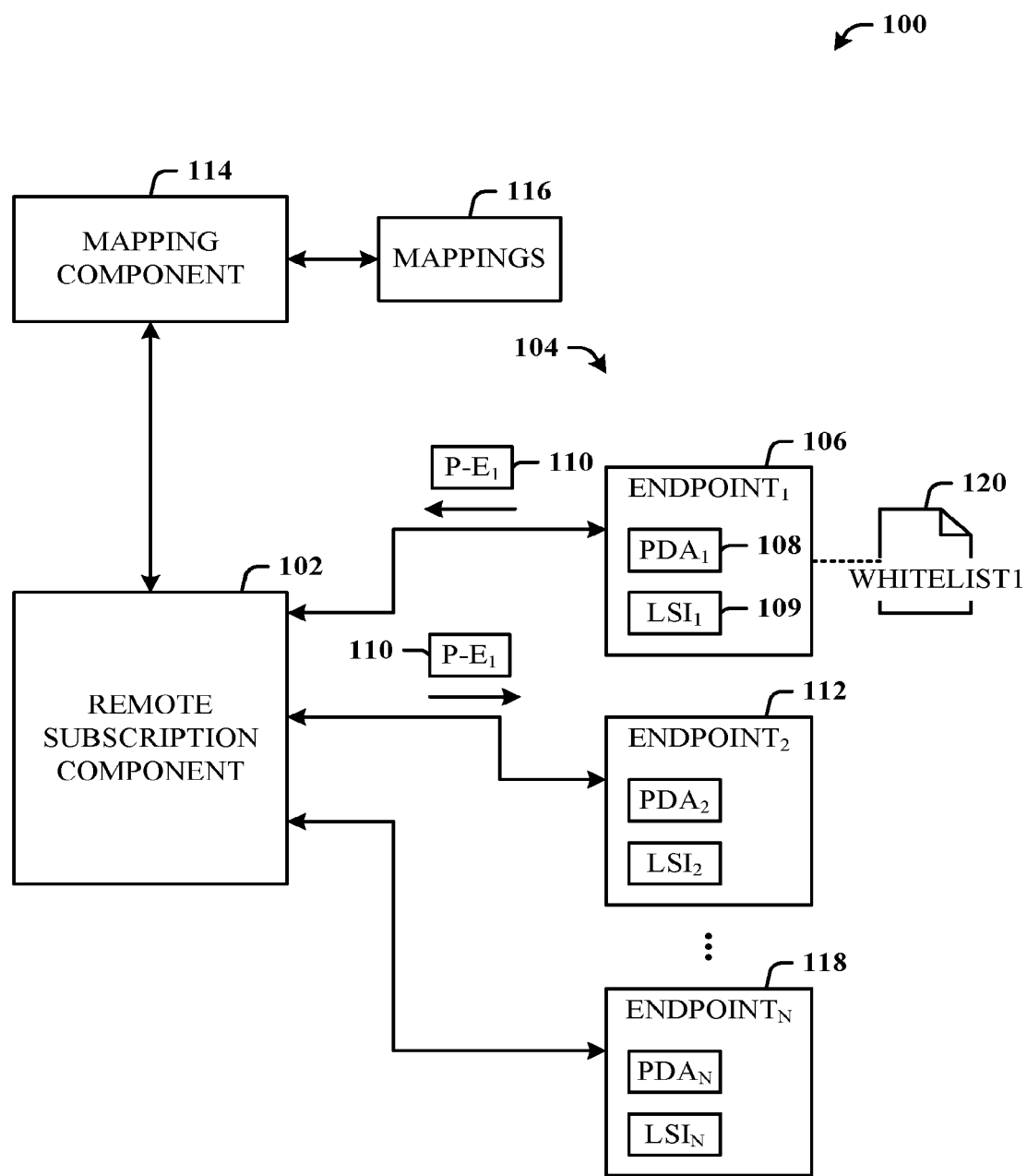
FIG. 1 illustrates a system in accordance with the disclosed architecture.

The disclosed architecture assists the user in sharing personalized proactive cards with each other using a personal digital assistant (PDA). The PDA discovers or is used to discover, the most relevant content (entities) for the user, proactively taking into account likes and dislikes of the user, and the user shares this personalized content with family and friends in social circles of the user. The disclosed architecture is a one-stop solution for sharing among users all types of content from all possible sources. The content, itself, can be personalized, and thus, the content that a sharing user shares with another (receiving) user, was meant for the sharing user. The content shared is, in the view of the sharing user, the view of the sharing user about some common content category.

The disclosed architecture at least solves the problem of people contacting a dynamically generated group of people, and sharing content that was not available to the group of people or was never personalized by the sharing user for that group of people. For example, User X is about a take a flight, and the flight is currently delayed. The PDA (e.g., intelligent interactive PDAs such as Cortana™ by Microsoft Corporation) finds this information for the user and presents this information to the user on the user's personalized (PDA) canvas along with other relevant information. Subsequently, the user wants to update the user's spouse about this information.

The popular current ways to solve this include calling the spouse, or sending a text message (e.g., SMS (short message service), MMS (multimedia message service), whatsapp message, etc.). In other words, using existing systems, the user must iterate everything presented to the user on the PDA "card" over the communication channel.

The disclosed architecture solves this existing encumbrance by enabling the simple sharing of the personalized content, which becomes personalized content that is then sent to the receiving user with whom the content is desired to be shared.

Generally, the disclosed architecture enables the user to designate (subscribe to) acceptance to receiving personalized relevant entities, embodied as social cards, for example, from the user's contacts list. This can be further extended by a concept of social circles for a user where the user can select to receive cards from an "inner" circle of friends, only, or both the inner circle and an outer circle of friends. In this example, the inner circle of friend can comprise a spouse and children. The outer circle of friends can comprise those users who are less concerned about the user flight. It is to be understood that the categories of sharing users can be more than an inner circle and an outer circle. For example, the categories of users can be a group of employees, a group of family members, a group of users all interest in a common subject, and so on, so there can be many types of users and groups of users.

Extra features such as blocking a user or a category of content can also be employed by the accepting user subscribing to the disclosed architecture. A storage (mapping) component maintains the mappings of all users who have accepted (registered, subscribed) to the disclosed architecture. The mappings of all users become a universal map securely protected from unauthorized access (e.g., the public) and can be queriable. A whitelist of users can be created that lists the users to whom a social card can be sent from an endpoint. The whitelist can be generated from the mapping component based on users who all agree to receive content from other users.

The user can create local groups dynamically at runtime on the user local endpoint, where the local groups enable the sharing of the personalized content with multiple users concurrently. These groups can be synchronized to all user devices. The shared card becomes available to the PDA on the proactive canvas of the recipient's PDA along with other cards. Based on the user engagement history, these cards can be ranked among other cards social or non-social PDA cards.

Multiple users willing to share the same or similar social card to a user can cause flooding of the single user with unneeded cards. Conflation prevents the recipient's (receiving user) canvas from being flooded by the same or similar social card from multiple other sharing users. Notifications of a shared card can be pushed to the recipient user endpoint. Additionally, card filtering can be provided based on the current interests of shared user. The disclosed architecture can choose or be configured to filter the shared content, or in some cases, enable the shared user to see the interests of the sharing user.

As used herein, an entity can be defined as having a distinct, separate existence, such as a person, a movie, a restaurant, an event, a book, a song, an album, or a place of interest. Each entity can have a name and a set of other attributes that describe it.

The disclosed architecture exhibits technical effects rooted in computer technology to overcome problems specifically occurring in the realm of computer systems and networks. More specifically, the architecture enables improved user efficiency in communicating (sending/receiving) personalized content (information) to other users. Since the social card is automatically created and communicated, there is a reduced error-rate in data entry, since the sharing user is typically removed from needing to re-enter information before transmission to the recipient user.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a remote (e.g., centralized access on a network based) subscription component 102 configured to enable the subscription (registration) of endpoints 104 to participate in the acceptance of instances of personalized relevant entities (P-Es) (also referred to as social cards). The endpoints 104 can be any type of device, such as desktop computing devices, mobile devices (e.g., cell phones), tablet PCs, laptops, and so on. The acceptances to receive the instances of the personalized relevant entities can be performed via PDAs of the corresponding endpoints. That is, a first endpoint 106 comprises a first PDA 108 via which to engage the disclosed architecture of social card sharing via the remote subscription component 102. In this example, the first (or sharing) user of the first endpoint 106 chooses to share a personalized relevant entity (P-$E_1$) 110 with a second user of a second endpoint 112. The second endpoint 112 subscribes (via the remote subscription component 102) to receive the P-$E_1$ 110 from the first endpoint 106.

Endpoint subscription to the disclosed architecture can be accomplished via a local subscription interface (LSI) of each endpoint. The local subscription interface can be configured to communicate with the remote subscription component 102 to handle notifications, endpoint status information, endpoint subscriptions, mappings, and so on. The local subscription interface can be a module that is part of the client device PDA or is separate from the PDA but operates to perform at least the above-mentioned functions for the PDA and disclosed architecture. Accordingly, the first endpoint 106 further comprises an LSI 109 that facilitates interfacing to the remote subscription component 102 directly and/or through the PDA 108.

A mapping component 114 is provided and configured to enable the creation and maintenance of (acceptance) mappings 116, which mapping component 114 maps acceptances between the endpoints 104 that subscribe to entity sharing, and securely stores the (acceptance) mappings 116. The mapping component 114 is configured to enable access by the remote subscription component 102 to the mappings 116, or to request a mapping contract of a specific user or group of users from the mapping component 114, to check on a status of an endpoint (or endpoint user).

Although not shown here, it is to be appreciated that the endpoint LSI can be configured to communicate directly to the mapping component 114 to obtain mapping information. Once an endpoint subscribes via the remote subscription component 102, the remote subscription component 102 can derive a secure key for a given LSI or PDA that can then be used for direct communications/access between the LSI/PDA and the mapping component 114 to access the mappings 116 only for that given accessing endpoint.

When a user is the receiving user, the receiving endpoint need only utilize the mapping component 114 (e.g., as part of or during the receiving process) to ensure the receiving user has contracted (or subscribed) to receive content from the sender (sharing user or sharing endpoint) by checking the acceptance mappings. This can be accomplished solely by the mapping component 114, or via the remote subscription component 102, which remote subscription component 102 accesses the mapping component 114 to analyze the acceptance mappings 116.

Alternatively, it is to be appreciated that a copy of the acceptance mappings 116 can be downloaded to the subscribed endpoints from the mapping component 114 such that the remote subscription component 102 accesses the local copy of the acceptance mappings of an endpoint to determine if the receiving user has an acceptance contract with the sharing user. The local mappings copy can be updated (e.g., pushed to the endpoints) as updates are made to the mapping component 114.

The remote subscription component 102 is configured to enable communication of a notification to an endpoint (e.g., the second endpoint 112) that sharing is accepted and a personalized relevant entity (the P-E$_1$ 110) is waiting to be shared. The notification can be in the form of a simple text message, audio tone, or a social card that comprises an entity graph and which gets included in the card list like any other card created from an entity graph, for example.

The remote subscription component 102 is configured to enable conflation of duplicative instances of the personalized relevant entities. Thus, if an entity/entity graph is shared by multiple users (e.g., wife, friend, son, etc.) then these are conflated so that this user sees only the entity graph with metadata describing who all shared the data. Thus, the same or similar P-Es shared from the first endpoint 106 and other endpoints (ENDPOINT$_N$) 118 are eliminated so that only a single P-E, the P-E$_1$ 110, is received by the second endpoint 112. The remote subscription component 102 can be configured to enable filtering of the personalized relevant entities based on current user interests. This can be considered a "loose" filtering in the sense that this filtering allows new entities to be received even if the user interest is not there because someone in user's social circle has shared this with him. This filtering can be considered more of a negative filtering where entities are filtered out that are known the user will not like or want to see.

The remote subscription component 102 is configured to synchronize user-created local groups among endpoints based on a one-to-many endpoint mapping relationship.

The mapping component 114 is configured to generate a whitelist 120 for a sharing endpoint (e.g., the first endpoint 106). The whitelist 120 identifies endpoints suitable for receiving of the personalized relevant entities from the sharing endpoint (the first endpoint 106). The whitelist 120 can be generated by the mapping component 114 for the first endpoint 106 or the first user of the first endpoint 106 can generate the whitelist 120 at the first endpoint 106.

In this first scenario, the user can request a listing of all mapped (accepting or receiving) users contracted to receive from the first user. This list can then be downloaded to the first endpoint 106 for any desired editing by the first user to remove one or more users. In this latter scenario, the whitelist 120 then never exists at the mapping component 114, but is created and resides on the endpoint 106; however, the whitelist 120 can be validated against the mappings 116 to ensure the identity of only those users who contracted to receive from the first user.

The remote subscription component 102 can be configured to enable ranked groups of acceptable endpoints from which to receive the personalized relevant entities. The ranked groups can have different designations of sharing (e.g., inner circle, outer circle, etc.). The personalized relevant entities can be represented visually as cards viewable in a card canvas of the personal digital assistant, and the cards are ranked according to card-engagement history of the user.

Figure 2:
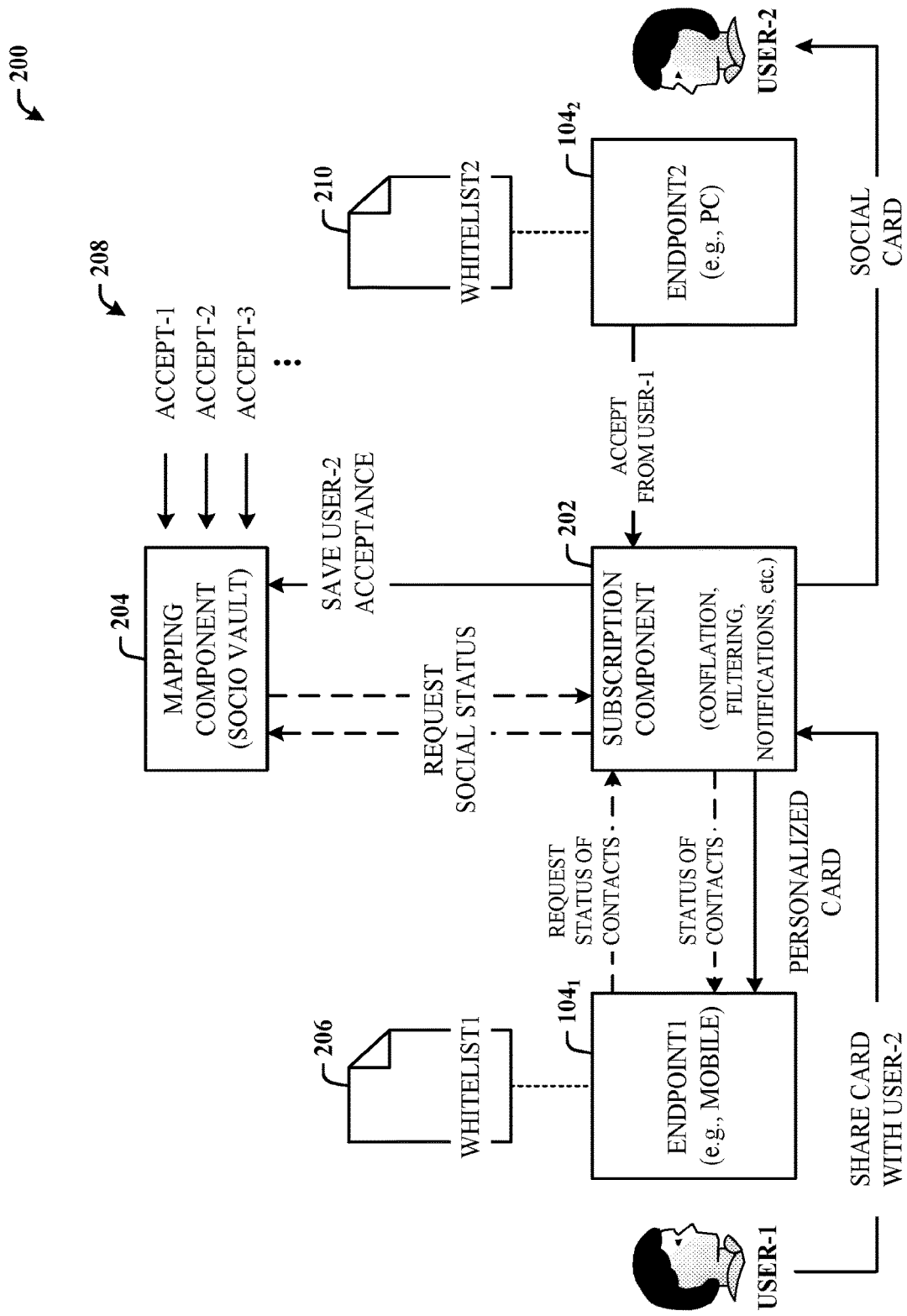
FIG. 2 illustrates a detailed alternative system that enables a social platform for the sharing of personalized entities among personal digital assistant users.

FIG. 2 illustrates a detailed alternative system 200 that enables a social platform for the sharing of personalized entities among personal digital assistant users. The system 200 comprises a subscription component 202 (e.g., a backend system, similar to the remote subscription component 102 of system 100), a mapping component 204 (e.g., similar to the mapping component 114 of system 100), and endpoints 104 (e.g., a first endpoint 1041 and a first endpoint 1042) that connect to the subscription component 202 to benefit from the sharing of the personalized entities via the endpoints 104. The endpoints can be any type of device, such computing devices, mobile devices (e.g., cell phones), tablet PCs, etc., that can utilize a personal digital assistant.

The entities (or content) can be shared among the personal digital assistants of the endpoints as "cards". A card can be defined as a digital virtual representation (as a standalone graphical object, e.g., resizable) that is made to appear as representing a physical card (e.g., a rectangular card) that simply bounds information (e.g., various types of media, such as text, image, colors, fonts, videos, etc.) in a polygonal format.

The disclosed architecture can be made available to all PDA-types and any framework that chooses to integrate this functionality. A privacy component can be employed in those frameworks that may choose to integrate increased privacy of the entities (content).

The subscription component 202 enables users such as User-1 and User-2, and many other users to obtain the benefit of sharing personalized entities. Subscription (registration) can entail the generation of a user profile suitable for identifying the users who choose to benefit from the sharing of the personalized entities (e.g., as cards). Subscription can require the creation of a username and password, user preferences, the selection of users to whom the subscribing user wants to share the content, categories of users (e.g., inner circle users and outer circle users) and other categories of information of the subscribing user such as hobbies, interests, favorite pastimes, websites frequently visited, content frequently obtained and viewed, and so on.

The subscription component 202 can be a backend service (e.g., as a standalone hardware system running the subscription software and other supporting software) to which users having endpoints running a PDA can access the disclosed architecture. A subscribed (or registered) user (e.g., User-1) can seek to share (send) a card with (to) a non-registered user (e.g., User-2). In this case, the non-registered user (User-2) will receive a notification from the subscription component 202 that the registered user (User-1) is attempting to share the card with the non-registered user (User-2).

In a first implementation, all cards (of personalized (relevant) entities) and checks occur in and through the subscription component 202. In an alternative implementation, the subscription component 202 employ secured communications technologies such as assigning encryption keys to the communications occurring between the users, such as User-1 and User-2. In this scenario, the card sharing can occur directly between the endpoints of User-1 and User-2 using compatible decryption technologies in the endpoints.

In an example of the first implementation, User-1 chooses to send (share) a card to User-2. From the perspective of Endpoint1 of the User-1, Endpoint1 can respond to the action by User-1 to share a card with User-2. The response of Endpoint1 can be to access the subscription component 202 with a request to obtain the social status of User-2. The subscription component 202 processes the request, and in response to the request, accesses the mapping component 204 to request the social status of User-2.

If User-2 has not subscribed to card sharing, the mapping component 204 will not have a mapping that defines a sharing relationship between User-1 and User-2. Thus, the social status returned from the mapping component 204 to the subscription component 202 indicates in some way that User-2 is not accepting shared cards, since there is no current mapping between User-1 and User-2. A non-acceptance status includes a registered user actively indicating the non-acceptance of social cards, and an unregistered user not in the system 200 at all. In both instances, User-2 will be defined as not accepting social cards. In either case, the subscription component 202 then returns the contact status information back to the Endpoint1, in response to which User-1 is notified of this non-acceptance status, and will not share the card.

It can be the case that the system 200 is provided the capability to enqueue cards to a user (e.g., User-2) and other users for sharing at a later time. For example, although the status of a registered user (e.g., User-2) is currently set to non-acceptance, it can be inferred that, based on prior shared user acceptance history, the shared user (User-2) changes status from non-acceptance to acceptance, in which case, the mapping component 204 updates the mapping between User-1 and User-2 and the enqueued cards are then shared to User-2.

With the enqueuing of each card, a notification can be communicated to the shared user for the newly-enqueued card that a specific sharing user (User-1) has shared a card. In this way, the shared User-2 can selectively choose which card to view at any point in time. In an alternative implementation, the entire queue of cards can be offset stacked (not viewed as directly on top of the underlying card, but slightly offset from the underlying card) in the viewing canvas. Hovering the pointing device pointer over any card in the stack can provide a brief popup box that is a brief description of the overall card entity (or content).

The Endpoint1 can be configured to regularly request the status of any number of users, continuously request the status of any number of users, or request the status only on-demand to User-1 choosing to share the social card with one or more users, and so on.

Alternatively, or in combination therewith, the subscription component 204 can be configured to automatically push contact (user) status data to the endpoints in response to the triggering of specific criteria, such as updates (changes) to user mappings in the mapping component 204. For example, if User-2 is on a contact list of User-1, but User-2, although registered, has temporarily disabled acceptance or changed to a non-acceptance status, this change can be detected as a trigger to push the status of User-2 to a whitelist 206 of User-1 (the whitelist 206 similar to the whitelist 120). Any registered user can obtain and be given a whitelist of contacts (other endpoints).

The social contacts of any registered user can be stored as the whitelist 206 of users to whom a card can be sent from an endpoint (e.g., Endpoint1). The whitelist can be generated from the mapping component 204 based on users who all agree to receive content from others or from specific users. In other words, the whitelist 206 can be only users to which User-1 chooses to send social cards, or the entire set of registered users in the system that are currently configured and mapped to accept social cards. In one whitelist implementation, the whitelist 206 of a user device can be polled from the mapping component 204 through subscription component 202, and a subset of users is created from the complete contact list of the mapping component 202. The subset of users can be only those users who are mapped to User-1 and/or groups (e.g., inner and outer circles) defined by User-1.

Continuing with the first implementation, but from the perspective of User-2, whether registered or not registered, Endpoint2 of User-2 can receive notification from the subscription component 202 that User-1 wants to share a social card (of personalized entity information). User-2 can choose to perform the steps needed to receive the shared card, such as registering (subscribing to) via the subscription component 202 and facilitating the communication of an acceptance from the subscription component 202 to the mapping component 204 so that User-2 is mapped to User-1 as accepting social cards from User-1, and this mapped relationship is stored in the mapping component 204 for status request access by the subscription component 202.

Once the User-2 acceptance (e.g., ACCEPT-2) is stored in the mapping component 204, the whitelist 206 of User-1 can be updated to include User-2 as a shared user. Thus, in one scenario, the whitelist 206 comprises only those users who choose to accept social cards. In an alternative scenario, the whitelist 206 include users who have a status of acceptance, and users who are registered but have a disabled acceptance (non-acceptance). As before, the whitelist 206 of a given user can comprise only the users User-1 chooses to share the social card(s), and no other users unrelated by mappings to User-1. Thus, the whitelist 206 can be small in size, more efficiently stored on small devices such as a cell phone, tablet, etc., and processed more quickly.

Continuing with the first implementation, once the User-2 acceptance resides in the mapping component 204, the status checks of Endpoint1 reveal that User-2 has accepted sharing from User-1. The personalized card (personalized entity (information)) is received at Endpoint1 from the subscription component 202, and from which Endpoint1 of User-1 then shares the personalized card to User-2 through the subscription component 202.

The sharing user (e.g., User-1) can create the personalized entity card as part of interfacing to the subscription component 202, which provides the capability to generate the social card. The social card can comprise any amount of information from basic user information (e.g., name, address, demographics, etc.) to a rich set of information about the user (e.g., names address, hobbies, interests, entities of interest, content the user frequents or wants to share, websites visited, etc.).

Put another way, User-2 (the shared user) accepts to receive social cards ("personalized entities", "personalized relevant entities", and "personalized entity information") from the contacts list of mappings 208 in the mapping component 204 by creating a one-to-one mapping between two users of the contact list or a one-to-many mapping of a single user to multiple users of the contact list. Such mappings 208 of a single user can be memorialized on the whitelist of the single user (e.g., the whitelist 210 of User-2).

The mapping component 204 can also comprise the capability to enable the grouping of shared users of a single sharing user. As indicated herein, this capability can be further extended by concept of "Inner Circle" (most trusted or preferred users) and "Outer Circle" (less trusted or less preferred users) for a user where the user can select to receive social cards from only an inner circle of users. This capability can be extended further to more than two groups of users, categorized by various criteria, such as geographical location, heritage, work, family, country, and so on. Thus, User-1 can choose to send a social card to a family group, for example. Once selected, the family group is processed to send a notification to each member of the family group that User-1 is requesting to the share a social card. Additional features of the subscription component 202 can include the blocking of a user or a category of content, for example.

The mapping component 204 (also referred to as a socio vault) maintains the mappings of identifiers for all users that have accepted the capabilities of the disclosed PDA sharing architecture. The related identifiers can be, in one implementation, a messaging identifier (e.g., an email ID) mapped to an ANID (anonymous ID). Other mappings can be employed in support of the disclosed architecture. Thus, the mapping component 204 generates a universal map (e.g., a graph) of all users, the universal map protected from the world and which can be queried by the subscription component 202.

The user (e.g., User-1) can create user groups dynamically at runtime on the local endpoint (e.g., Endpoint1) so that the user can share the personalized entities with multiple users at one time. These local groups of a given user can be synchronized to all devices of the given user using the subscription component 202.

The shared social card becomes available as a PDA social card on the proactive canvas (the viewing surface or interface of the application via which the social card is being viewed) of the recipient (shared user) along with other cards (e.g., non-shared cards of the PDA application but cards normally used as part of the PDA application with or without sharing enabled). In one implementation, the shared card can be ranked and presented along with other non-shared cards. The social card ranking can be based on the user engagement history, for example.

The system 200 enables conflation. Multiple users may be willing to share the same or similar social card to a user (a many-to-one scenario), and thus, conflation at the subscription component 202 is provided so that the shared users canvas is not flooded by the same or similar social card (e.g., shared by User-3, User-4, User-8, and three other users).

Notifications can be provided as relate to the handling (e.g., notifying a shared (or recipient) user of the intent to share a social card) of the social cards (personalized entities). The notification can be pushed to user endpoints. For example, in an endpoint running the Windows' operating system (OS), toast notifications (temporary OS-based visual element pop-ups) can operate to facilitate notifying the endpoint user of the receipt of one or more social cards. This improves the user experience for users who do not open their proactive canvas or do not have a high level of engagement with the canvas. In an alternative notification implementation, tile notifications can be employed.

The subscription component 202 can also employ card filtering. Based on the current interests of a user, the subscription component 202 can choose or be configured to respond to one or more signals, to filter the shared social card information. For example, in some cases, the user experience in sharing PDA personalized entities can be filtered by interest. The subscription component 202 can be configured to enable a user to enable/disable interest filtering to receive/share shared entities of common interests or that the sharing user think the shared user may find interesting.

The disclosed architecture can optionally include a privacy component that enables the user to opt in or opt out of exposing personal information. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

It is to be understood that in the disclosed architecture, certain components may be rearranged, combined, omitted, and additional components may be included. Additionally, in some implementations, all or some of the components are present on the client, while in other implementations some components may reside on a server or are provided by a local or remote service. For example, the mapping component 114 (or 204) can reside with the remote subscription component 102 (or 202) on the same platform.

Figure 3:
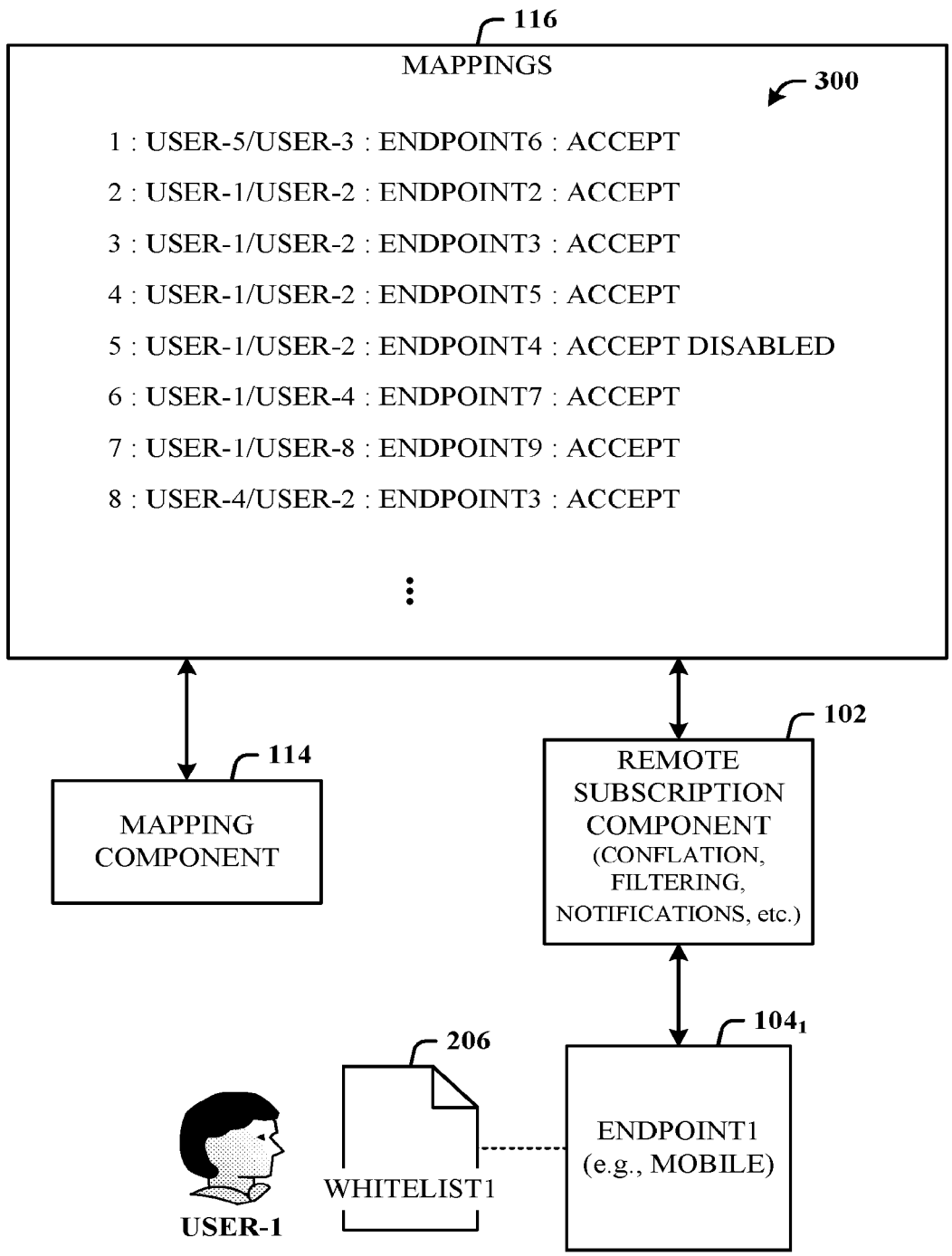
FIG. 3 illustrates exemplary generalized pseudo mappings of user acceptances as generated and stored by the mapping component.

FIG. 3 illustrates exemplary generalized pseudo mappings 116 of user acceptances as generated and stored by the mapping component 114. In practice, at least identifiers can be employed that identify objects or programs associated with the sharing user (the user sending the social card) and the shared user (the user accepting receipt of social cards). These mappings 116 are similar to the mappings 208 generated and stored by the mapping component 204. The mappings 116 illustrate the one-(accepting)from-one, one-(accepting)from-many, many-(accepting)from-one mappings supported by the disclosed architecture, where a subscribing user chooses to only accept from one other sharing user (one-from-one), a subscribing user chooses to accept from multiple other sharing users (one-from-many), and multiple subscribing users choose to accept from the same sharing user (many-from-one). It is to be understood that the disclosed architecture normally handles many-to-many mappings, since any receiving user can choose to receive a social card from any number of other users, and those other users can also choose to receive social cards from multiple other users, which can include the receive user.

There are eight depicted mappings 300 in the overall mappings 116. Mapping #1 illustrates a one-from-one mapping of User-5 subscribing to receive or accept the personalized entity(ies) from an Endpoint6 of User-3. Mappings #2-7 illustrate one-from-many mappings (relationships) of the receiving or accepting user (User-1) choosing to receive entities from the same user (User-2), but from different endpoints of User-2, and separate instances from different users (User-4 and User-8). As shown, the receiving user, User-1, can choose to accept social cards from User-2 from three of four User-2 endpoints (Endpoint2, Endpoint3, Endpoint5), and choose to not accept social cards from one endpoint of User-2, Endpoint4. User-2 can choose to re-enable social card acceptance at Endpoint4 at any time.

This capability illustrates that the mapping component 114 can support many-from-one communications to endpoints, rather than relying on a single user endpoint handling the distribution or receipt of social cards to/from other endpoints of the same user. Mappings #2 and #8 illustrate many-from-one mappings, where User-1 and User-4 can choose to accept social cards from User-2. Note that the mappings can each include acceptance level information that identifies the specific mapping to a specific acceptance level such as accept form everyone, accept only from family, accept only from a contacts list, etc.

Figure 4:
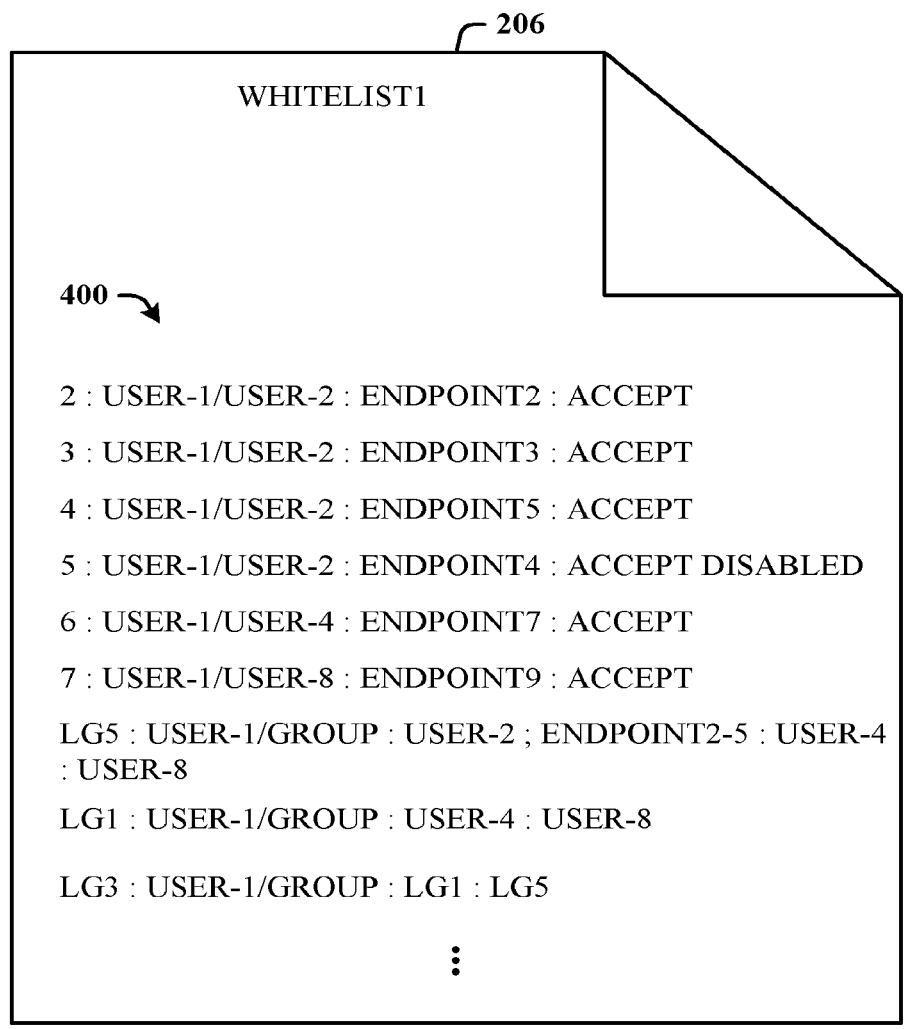
FIG. 4 illustrates an exemplary whitelist of whitelist entries and whitelist functions in accordance with the disclosed architecture.
Figure 4:

FIG. 4 illustrates an exemplary whitelist 206 of whitelist entries 400 and whitelist functions in accordance with the disclosed architecture. The user whitelist 206 can be generated for User-1 when User-1 requests mappings of all users who choose to accept social cards from User-1. In response, the mapping component 114 generates the whitelist from the overall list of mappings 116 and sends the whitelist 206 to Endpoint1 of User-1. User-1 can choose to further edit the whitelist 206 to remove or modify entries. Based on this whitelist 206, the User-1 can create local groups of users from which to accept entities. For example, where the whitelist 206 includes close family members, User-1 can use the local PDA program, or some other suitable application, to create user groups in the whitelist 206 from which a social card can be received. Thus, the PDA program will process social card acceptance to User-1 according to the local groups identified when User-1 accepts a card from the entire group. This capability is depicted in the whitelist mappings 400 with list item LG5 (Local Group-5) and list item LG3.

Local Group-5 (LG5) indicates that User-1 has grouped User-2 and User-2 endpoints, User-4, and User-8, from which User-1 will accept social cards. Similarly, Local Group-1 (LG1) defines a group that includes User-4 and User-8, from which User-1 will accept social cards. The disclosed architecture can also support the local grouping of groups. Thus, Local Group-3 (LG3) defines a grouping of multiple groups, LG1 and LG5, from which User-1 will accept social cards.

When processing a local group, the local PDA program can process (disassemble) the whitelist items into instructions understandable by the mapping component 114 such that the remote subscription component 102 can then execute sharing, acceptance, notifications, conflation, and filtering as described herein. For example, the processing of LG1 results in User-1 receiving social card(s) from users User-4 and User-8.

Included herein is a set of flowcharts representative of exemplary methodologies for performing novel aspects of the disclosed architecture. While, for purposes of simplicity of explanation, the one or more methodologies shown herein, for example, in the form of a flowchart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
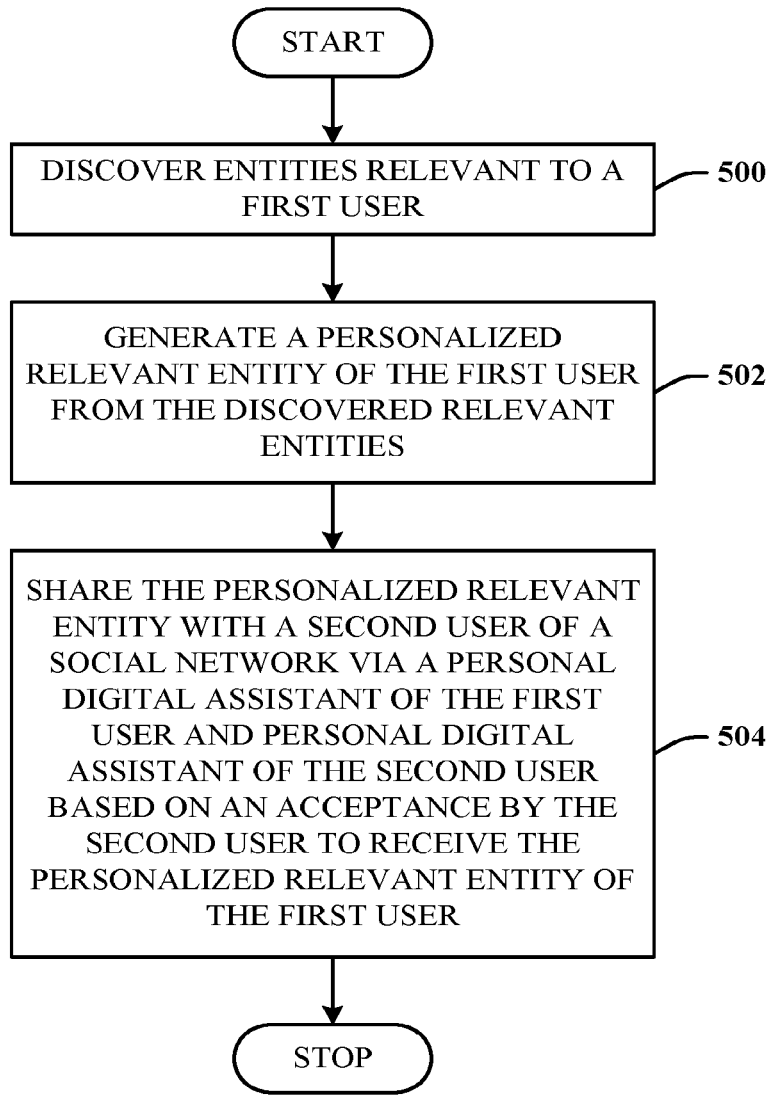
FIG. 5 illustrates a method in accordance with the disclosed architecture.

FIG. 5 illustrates a method in accordance with the disclosed architecture. At 500, entities relevant to a first user are discovered. At 502, a personalized relevant entity of the first user is generated from the discovered relevant entities. At 504, the personalized relevant entity with a second user of a social network via a personal digital assistant of the first user and personal digital assistant of the second user based on an acceptance by the second user to receive the personalized relevant entity of the first user.

The method can further comprise enabling subscription by the second user to receive the personalized relevant entity from the first user. The method can further comprise creating an acceptance mapping between the first user and the second user. The method can further comprise storing acceptance mappings, which include the acceptance mapping, in a secure storage, the acceptance mappings are queriable in the secure storage.

The method can further comprise filtering the shared personalized relevant entity according to an interest or a lack of interest. The method can further comprise pushing a notification of the shared personalized relevant entity.

Figure 6:
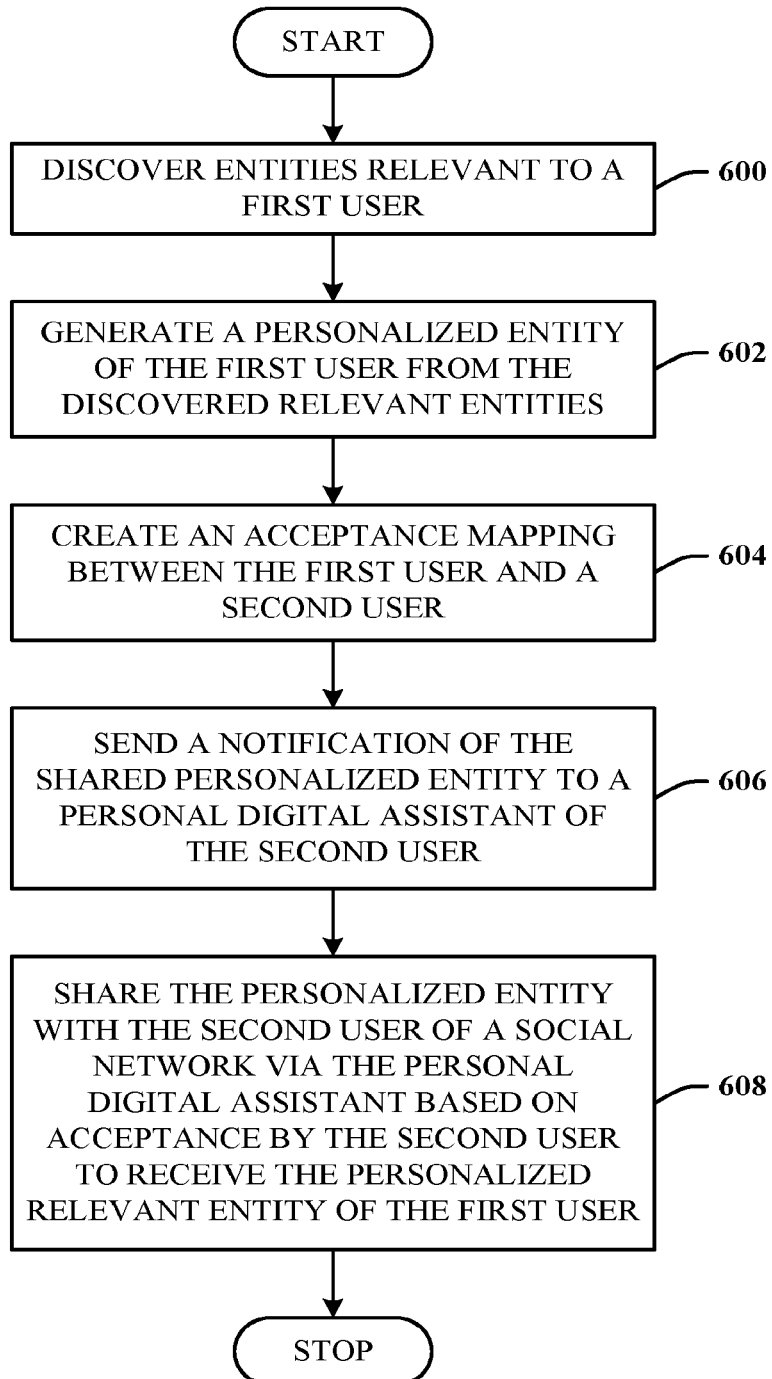
FIG. 6 illustrates an alternative method in accordance with the disclosed architecture.

FIG. 6 illustrates an alternative method in accordance with the disclosed architecture. At 600, entities relevant to a first user are discovered. At 602, a personalized entity of the first user is generated from the discovered relevant entities. At 604, an acceptance mapping is created between the first user and a second user. At 606, a notification of the shared personalized entity is sent to a personal digital assistant of the second user. At 608, the personalized entity is shared with the second user of a social network via the personal digital assistant. The sharing is accomplished because the second user subscribed to accepting personalized entities from the first user.

The method can further comprise conflating multiple instances of the personalized entity received from multiple users to mitigate canvas flooding of multiples instances of the personalized entity at an endpoint of the second user. The method can further comprise enabling status checking of the second user on the social network.

The method can further comprise creating at a local endpoint and at runtime, a group of users to whom the personalized entity can be shared concurrently. The method can further comprise synchronizing user-created local groups among endpoints based on (e.g., one-from-many, many-from-one, one-from-one) endpoint acceptance mapping relationships. The method can further comprise generate a whitelist for an endpoint, where the whitelist identifies endpoints suitable for receiving the personalized entities.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
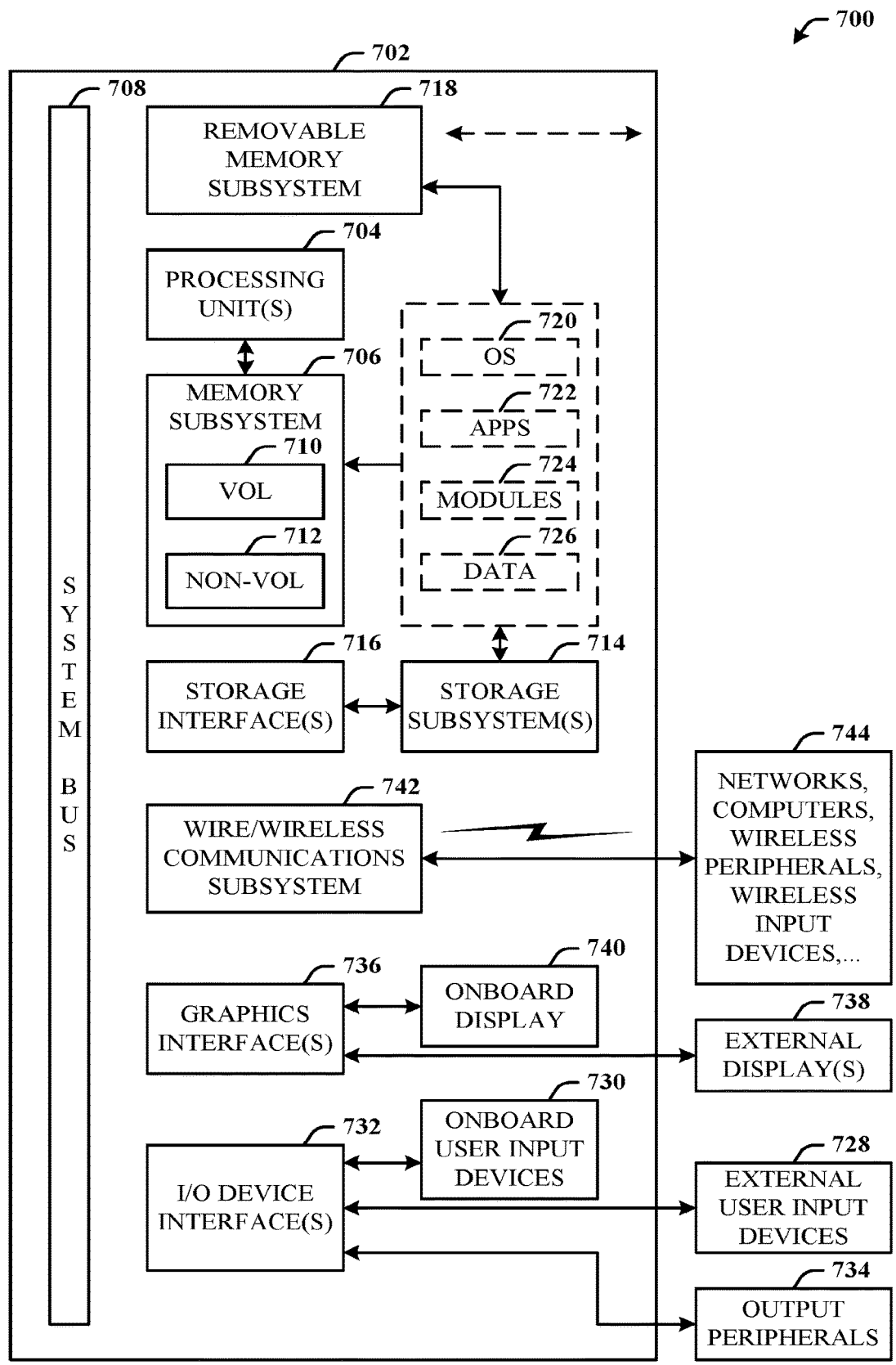
FIG. 7 illustrates a block diagram of a computing system that executes card sharing via personal digital assistants in accordance with the disclosed architecture.

Referring now to FIG. 7, there is illustrated a block diagram of a computing system 700 that executes card sharing via personal digital assistants in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 700 for implementing various aspects includes the computer 702 having microprocessing unit(s) 704 (also referred to as microprocessor(s) and processor(s)), a computer-readable storage medium (where the medium is any physical device or material on which data can be electronically and/or optically stored and retrieved) such as a system memory 706 (computer readable storage medium/media also include magnetic disks, optical disks, solid state drives, external memory systems, and flash memory drives), and a system bus 708. The microprocessing unit(s) 704 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage) medium such as a volatile (VOL) memory 710 (e.g., random access memory (RAM)) and a non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the microprocessing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components and circuits. The storage subsystem(s) 714 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include items and components of the system 100 of FIG. 1, items and components of the alternative system 200 of FIG. 2, the mappings 116 of FIG. 3, the whitelist 206 of FIG. 4, and the methods represented by the flowcharts of FIGS. 5 and 6, for example.

Generally, programs include routines, methods, data structures, other software components, etc., that perform particular tasks, functions, or implement particular abstract data types. All or portions of the operating system 720, applications 722, modules 724, and/or data 726 can also be cached in memory such as the volatile memory 710 and/or non-volatile memory, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 702, and include volatile and non-volatile internal and/or external media that is removable and/or non-removable. For the computer 702, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 702, programs, and data using onboard user input devices 730 such a touchpad, microphone, keyboard, etc., where the computer 702 is a portable computer, for example.

These and other input devices are connected to the microprocessing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a system, comprising: means for discovering entities relevant to a first user; means for generating a personalized relevant entity of the first user from the discovered relevant entities; and, means for sharing the personalized relevant entity with a second user of a social network via a personal digital assistant of the first user and personal digital assistant of the second user based on an acceptance by the second user to receive the personalized relevant entity of the first user.

The disclosed architecture can be implemented as an alternative system, comprising: means for discovering entities relevant to a first user; means for generating a personalized entity of the first user from the discovered relevant entities; means for creating an acceptance mapping between the first user and a second user; means for sending a notification of the shared personalized entity to a personal digital assistant of the second user; and, means for sharing the personalized entity with the second user of a social network via the personal digital assistant based on an acceptance by the second user to receive the personalized entity of the first user.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   one or more processing units; and
   memory storing instructions that, when executed by the one or more processing units, cause the system to perform operations, comprising:
   receive, from a first computing device associated with a first user, an instance of personalized content to be shared with a second user associated with a second computing device;
   access a mapping of acceptances for receiving personalized content between the first user and the second user;
   based on the mapping, determine that the second user has not accepted receiving personalized content from the first user;
   enqueue the instance of personalized content;
   determine a change in status for the second user; and
   based on the change in status for the second user, share the instance of personalized content from the queue and cause the instance of personalized content to become available on an interface of the second computing device associated with the second user.

2. The system of claim 1, wherein determining the change of status for the second user comprises determining that the second user has accepted receiving personalized content from the first user.

3. The system of claim 1, wherein the instructions when executed further cause the system to provide a notification to the second computing device, and wherein the notification indicates that the first user attempted to share the instance of personalized content.

4. The system of claim 1, wherein the instructions when executed further cause the system to:

receive a second instance of personalized content to be shared with the second user; and enqueue the second instance of personalized content with the first instance of personalized content.

5. The system of claim 4, wherein the instructions when executed further cause the system to:

based on the change of status for the second user, deliver a notification to the second computing device, wherein the notification displays at least the first instance of personalized content and the second instance of personalized content in an offset stack.

6. The system of claim 5, wherein the first instance of personalized content and the second instance of personalized content are selectable in any order from the offset stack.

7. The system of claim 1, wherein delivering the first instance of personalized content further comprises representing the first instance of personalized content visually as a card viewable in a card canvas at the second computing device.

8. A method, comprising:

receiving, from a first computing device associated with a first user, a first instance of personalized content to be shared with a second user associated with a second computing device;

receiving, from a third computing device associated with a third user, a second instance of personalized content to be shared with the second user;

accessing a mapping of acceptances for receiving personalized content between the first user, the second user, and the third user;

based on the mapping, determining that the second user accepted receiving personalized content from the first user and the third user;

determining that the first instance of personalized content and the second instance of personalized content are similar; and providing one of the first instance of personalized content or the second instance of personalized content to the second user.

9. The method of claim 8, further comprising:

determining that the first instance of personalized content and the second instance of personalized content are similar based on one or more measurable parameters.

10. The method of claim 8, further comprising:

providing a notification to the second computing device, wherein the notification indicates that the first user and the third user shared instances of personalized content.

11. The method of claim 10, wherein the notification further indicates that the second user accepted receiving personalized content from the first user and the third user.

12. The method of claim 8, further comprising:

synchronizing user-created local groups among at least the first and second computing devices based on a one-to-many computing device mapping relationship.

13. The method of claim 8, further comprising:

generating a whitelist, wherein the whitelist identifies one or more computing devices suitable for receiving the instance of personalized content from the first computing device.

14. The method of claim 8, further comprising:

receiving, from the first computing device, a third instance of personalized content to be shared with the second user;

applying a filter based on preferences of the second user; and based on the filter, preventing delivery of the third instance of personalized content to the second user.

15. The method of claim 14, wherein the filter is based on current user interests of the second user.

16. The method of claim 8, wherein one of the first instance of personalized content or the second instance of personalized content is provided visually as a card viewable in a card canvas at the second computing device.

17. A computer readable storage medium storing instructions that, when executed by a processing unit, causes the processing unit to perform operations, comprising:

receive, from a first computing device associated with a first user, a first instance of personalized content to be shared with a second user associated with a second computing device;

receive, from a third computing device associated with a third user, a second instance of personalized content to be shared with the second user;

access a mapping of acceptances for receiving personalized content between the first user, the second user, and the third user;

based on the mapping, determine that the second user accepted receiving personalized content from at least the first user and the third user;

determine current interests of the second user; and based on the current interests of the second user, provide one of the first instance of personalized content or the second instance of personalized content to the second user.

18. The computer readable storage medium of claim 17, wherein the instructions when executed further cause the processing unit to provide a notification to the second computing device, wherein the notification indicates that the second user accepted receiving personalized content from at least the first user or the third user.

19. The computer readable storage medium of claim 17, wherein the instructions when executed further cause the processing unit to provide a notification to the second computing device, wherein the notification indicates that the first user and the third user shared instances of personalized content.

20. The computer readable storage medium of claim 17, wherein the current interests of the second user are based on input from the second user.

* * * * *